(12) United States Patent
Lemberger

(10) Patent No.: US 6,796,170 B2
(45) Date of Patent: Sep. 28, 2004

(54) DUST SHIELD FOR TEMPERATURE AND PRESSURE COMPENSATING INDICATOR

(76) Inventor: Gary Lemberger, 100 NW. 82nd Ave., Suite 402, Plantation, FL (US) 33304

( * ) Notice: Subject to any disclaimer, the term of this patent is extended or adjusted under 35 U.S.C. 154(b) by 0 days.

(21) Appl. No.: 10/426,184

(22) Filed: May 1, 2003

(65) Prior Publication Data

US 2003/0200799 A1 Oct. 30, 2003

Related U.S. Application Data

(63) Continuation-in-part of application No. 09/963,610, filed on Sep. 25, 2001, now Pat. No. 6,595,046, and a continuation-in-part of application No. 09/740,135, filed on Dec. 20, 2000, now abandoned, and a continuation-in-part of application No. 09/523,470, filed on Mar. 10, 2000, now Pat. No. 6,374,666.

(51) Int. Cl.$^7$ ............................................. B60C 23/02
(52) U.S. Cl. ................................... 73/146.2; 73/146.8
(58) Field of Search ............................. 73/146.2, 146.8

(56) References Cited

U.S. PATENT DOCUMENTS

| | | | | |
|---|---|---|---|---|
| 5,535,623 A | * | 7/1996 | Heyns | 73/146.8 |
| 5,614,669 A | * | 3/1997 | Sopcisak | 73/146.8 |
| 5,853,020 A | * | 12/1998 | Widner | 137/227 |
| 6,055,855 A | * | 5/2000 | Straub | 73/146.8 |
| 6,125,694 A | * | 10/2000 | Bledsoe | 73/146.8 |

* cited by examiner

Primary Examiner—Edward Lefkowitz
Assistant Examiner—Corey D. Mack
(74) Attorney, Agent, or Firm—Oltman, Flynn & Kubler

(57) ABSTRACT

A dust shield for fitting around and removably engaging an air pressure gauge apparatus fitted to a tire valve stem protruding from and in fluid communication with the interior of a tire, the pressure gauge apparatus including a tubular gauge housing substantially coaxial with the valve stem and having a gauge housing connected end secured to the valve stem and a gauge housing free end opposite the gauge housing connected end, the dust shield including a shield tubular body having an open longitudinal shield entry end which receives and passes the gauge housing as the dust shield is slid over the pressure gauge apparatus and sealingly abuts the tire valve stem and an open longitudinal shield exposing end through which the gauge housing free end slides out of the dust shield and is exposed for viewing and which sealingly abuts the gauge housing.

17 Claims, 2 Drawing Sheets

DUST SHIELD FOR TEMPERATURE AND PRESSURE COMPENSATING INDICATOR

This application is a continuation-in-part of application Ser. No. 09/523,470 filed on Mar. 10, 2000, now U.S. Pat. No. 6,374,666 and of application Ser. No. 09/740,135 filed on Dec. 20, 2000, now abandoned and of application Ser. No. 09/963,610 filed on Sep. 25, 2001, now U.S. Pat. No. 6,595,146 and is based on the contents of disclosure document number 529319 filed on Apr. 8, 2003.

BACKGROUND OF THE INVENTION

1. Field of the Invention

The present invention relates generally to the fields of tires and tire pressure gauges. More specifically the present invention relates to a dust shield for fitting around and removably engaging an air pressure gauge apparatus as described in application Ser. No. 09/963,610 filed on Sep. 25, 2001 fitted to a tire valve stem. The pressure gauge apparatus onto which the dust shield is fitted includes an elongate tubular gauge housing which screws onto a standard valve stem and is coaxial with the valve stem, has a housing connected end screwed onto the valve stem and a housing free end opposite the housing connected end, and preferably includes a pressure indicator display window and has an outwardly protruding and circumferential gauge flange.

The inventive dust shield includes a shield tubular body having a longitudinal shield entry end which receives the gauge housing as the dust shield is slid over the gauge, and a longitudinal shield exposing end through which the housing free end slides out of the dust shield and is exposed for unobstructed viewing of the pressure indicator display window. The dust shield preferably includes a circumferential internal shield channel which is sized and positioned to engagingly receive the gauge flange to releasibly lock the dust shield onto the gauge. The dust shield preferably bows outwardly at its middle section and tapers to narrower ends so that both open ends of the dust shield snugly abut and sealingly grip the gauge and valve stem, while much of the middle segment is spaced outwardly from the gauge housing to limit sliding friction between the dust shield and the gauge housing, making the dust shield easier to slide onto the gauge and to permit more ready deformation of the middle segment as the internal shield channel fits and snaps over the gauge flange. The outwardly bowed middle segment shape also permits user fingers to more readily grip the exterior of the dust shield.

The material from which the dust shield is formed preferably is flexible and resilient to permit momentary dust shield deformation to permit the dust shield to fit over and engage the gauge housing and gauge flange, and preferably is tacky to have a strong friction grip and seal around the gauge housing. The preferred material is silicone.

2. Description of the Prior Art

There have long been gauges for measuring the pressure of air contained within vehicle tires. A problem with such prior gauges is that dust can enter the gauges and jam gauge moving parts, preventing reliable gauge operation.

It is thus an object of the present invention to provide a tire gauge dust shield apparatus which encloses the junction between the valve stem and the pressure gauge to prevent entry of dust and dirt which might jam gauge moving parts.

It is another object of the present invention to provide such a dust shield apparatus which removably fits over a tire gauge.

It is still another object of the present invention to provide such a dust shield apparatus which includes an internal circumferential shield channel sizes and positioned to receive and releasibly engage a circumferential gauge flange.

It is yet another object of the present invention to provide such a dust shield apparatus which is bowed outwardly and spaced outwardly from the valve stem at the dust shield middle region.

It is finally an object of the present invention to provide such a dust shield apparatus which is highly economical to manufacture, simple in design, light weight, compact, optionally transparent to reveal gauge readings and highly durable.

SUMMARY OF THE INVENTION

The present invention accomplishes the above-stated objectives, as well as others, as may be determined by a fair reading and interpretation of the entire specification.

A dust shield is provided for fitting around and removably engaging an air pressure gauge apparatus fitted to a tire valve stem protruding from and in fluid communication with the interior of a tire, the pressure gauge apparatus including a tubular gauge housing substantially coaxial with the valve stem and having a gauge housing connected end secured to the valve stem and a gauge housing free end opposite the gauge housing connected end, the dust shield including a tubular body having an open longitudinal shield entry end which receives and passes the gauge housing as the dust shield is slid over the pressure gauge apparatus and sealingly abuts the tire valve stem and an open longitudinal shield exposing end through which the gauge housing free end slides out of the dust shield and is exposed for viewing and which sealingly abuts the gauge housing.

Where the air pressure gauge apparatus preferably includes an outwardly protruding and circumferential gauge flange, the dust shield preferably additionally includes a circumferential internal shield channel sized and positioned to engagingly receive the gauge flange when the dust shield is fitted over the gauge housing to releasibly lock the dust shield onto the gauge housing. The tubular body preferably has a shield middle section which bows outwardly relative to the shield entry end to be spaced outwardly from the gauge housing. The pressure gauge housing free end preferably includes a pressure indicator display window and a pressure indicator element visible through the indicator display window displaying tire pressure.

The dust shield preferably includes a material which is flexible and resilient to permit momentary deformation of the dust shield to permit the dust shield to fit over and engage the gauge housing. The dust shield preferably includes a material which is transparent, and this material preferably is silicone.

An apparatus is further provided including a tire having a tire interior and a tire stem secured to the tire and in fluid communication with the tire interior; an air pressure gauge apparatus fitted to the tire valve stem, the pressure gauge apparatus including a tubular gauge housing substantially coaxial with the valve stem and having a gauge housing connected end secured to the valve stem and a gauge housing free end opposite the housing connected end; and a dust shield having a tubular body having a longitudinal shield entry end and being fitted around the gauge housing, the entry end sealingly abutting the valve stem.

Once again, where the air pressure gauge apparatus preferably includes an outwardly protruding and circumferential gauge flange, the dust shield preferably additionally includes a circumferential internal shield channel sized and positioned to engagingly receive the gauge flange to releasibly lock the dust shield onto the gauge housing. The tubular body preferably has a shield middle section which bows outwardly to be spaced outwardly from the gauge housing. The pressure gauge housing free end preferably includes a pressure indicator display window and a pressure indicator element visible through the indicator display window displaying tire pressure.

A dust shield is further provided for fitting around and removably engaging an air pressure gauge apparatus fitted to a tire valve stem protruding from and in fluid communication with the interior of a tire, the pressure gauge apparatus including a tubular gauge housing substantially coaxial with the valve stem and having a gauge housing connected end secured to the valve stem and a gauge housing free end opposite the gauge housing connected end, the dust shield including a tubular body having an open longitudinal shield entry end which receives and passes the gauge housing as the dust shield is slid over the pressure gauge apparatus and sealingly abuts the tire valve stem.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 3:
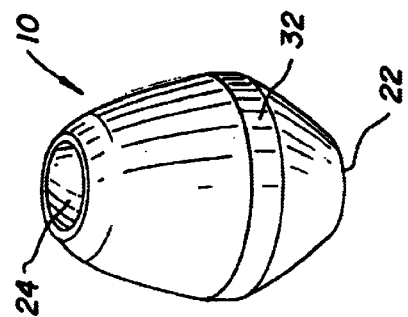
FIG. 3 is a perspective view of the dust shield of FIG. 1.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

The Invention Generally

Referring to FIGS. 1–4, a dust shield 10 for fitting around and removably engaging an air pressure gauge apparatus 100, such as that described in application Ser. No. 09/963,610 filed on Sep. 25, 2001 fitted to a valve stem 200 of a tire T.

The pressure gauge apparatus 100 onto which the dust shield 10 is fitted includes an elongate tubular gauge housing 120 which screws onto a standard valve stem 200 and is coaxial with the valve stem 200, has a gauge housing connected end 122 screwed onto the valve stem and a gauge housing free end 124 opposite the housing connected end 122 including a pressure indicator display window 126 and has an outwardly protruding and circumferential gauge flange 132. The pressure gauge apparatus 100 displays the tire pressure either continuously or momentarily with the application of force to a portion of the apparatus. The gauge housing 120 contains a received air chamber for placement in fluid communication with received air from within a vehicle tire and containing a biasing air chamber containing a fixed quantity of biasing air, the chambers being sealingly separated from each other by a pressure equilibration structure which includes a pressure indicator element which is visible through the indicator display window 126.

Preferred Embodiment

The dust shield 10 includes a shield tubular body 20 having an open longitudinal shield entry end 22 which receives the gauge housing 120 as the dust shield 10 is slid over the gauge apparatus 100, and an open longitudinal shield exposing end 24 through which the housing free end 124 slides out of the dust shield 10 and is exposed for unobstructed viewing of the pressure indicator display window 126. The dust shield 10 includes a circumferential internal shield channel 32 which is sized and positioned to engagingly receive the gauge flange 132 to releasibly lock the dust shield 10 onto the gauge housing 120. The dust shield 10 preferably bows outwardly at its middle section and tapers to narrower ends 22 and 24 so that both open ends 22 and 24 of the dust shield 10 snugly abut and sealingly grip the gauge housing 120 or valve stem 200 itself, while much of the shield 10 middle segment is spaced outwardly from the gauge housing 120 to limit sliding friction between the dust shield 10 and the gauge housing 120 to make the dust shield 10 easier to slide onto the gauge apparatus 100 and to permit more ready deformation of the shield 10 middle segment as the internal shield channel 32 fits and snaps over the gauge flange 132. The outwardly bowed shield 10 middle segment shape also permits the user fingers to more readily grip the exterior of the dust shield 10.

Figure 2:
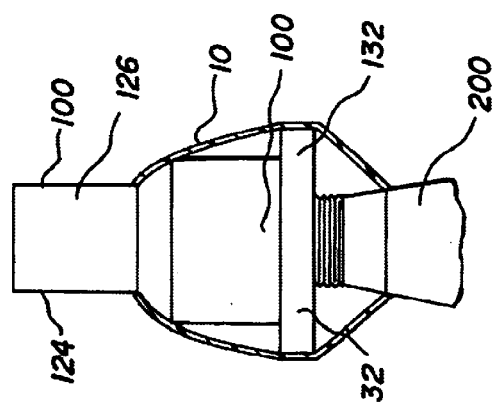
FIG. 2 is a side view of the dust shield of FIG. 1 fitted over the air pressure gauge and the air pressure gauge screwed onto the valve stem free end, with the dust shield shown in cross-section.
Figure 1:
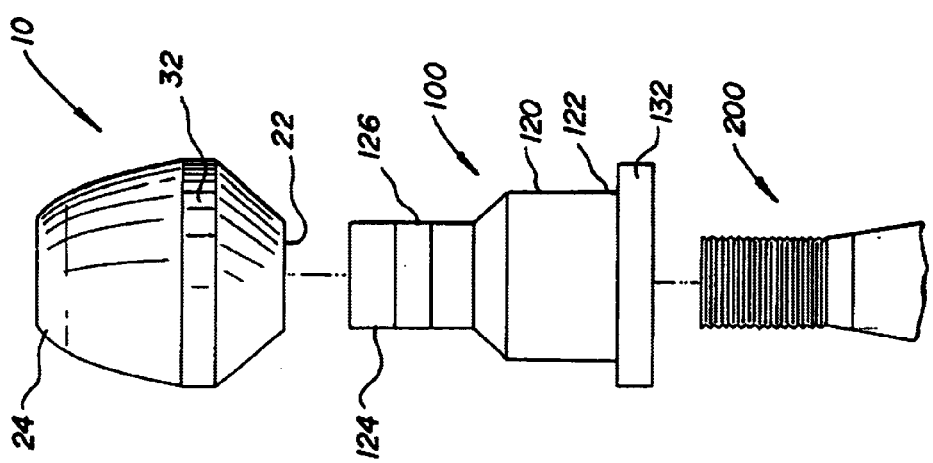
FIG. 1 is an exploded side view of the inventive dust shield positioned to be fitted over an air pressure gauge which in turn is positioned to be screwed onto the free end of a tire valve stem.
Figure 4:
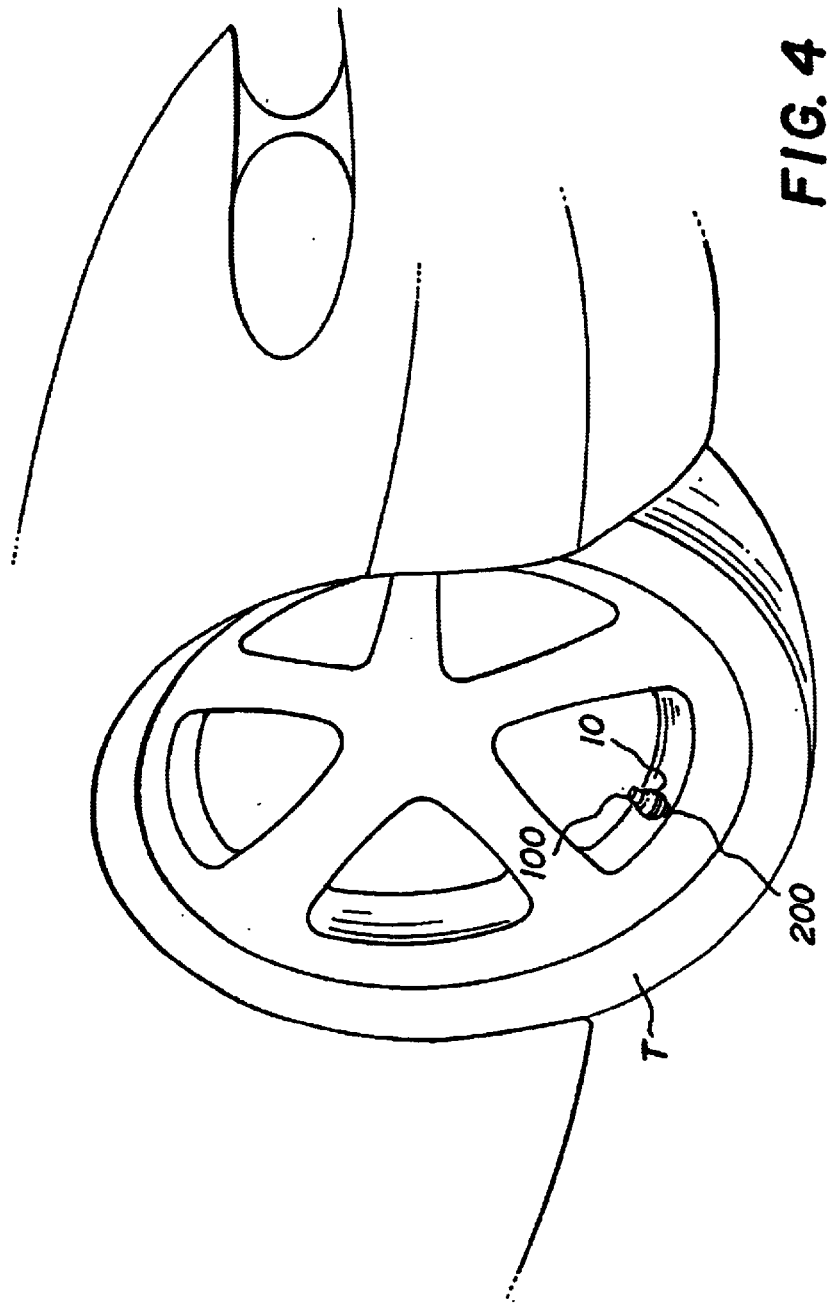
FIG. 4 is a perspective view of a vehicle tire having a valve stem fitted with an air pressure gauge covered with the present dust shield.

The material from which the dust shield 10 is formed preferably is transparent, and preferably is flexible and resilient to permit momentary dust shield 10 deformation to permit the dust shield 10 to fit over and engage the gauge housing 120 and gauge flange 132, and preferably is tacky to have a strong friction grip and seal around the gauge housing 120. Since the preferred dust shield 10 is transparent, the portions of gauge apparatus 100 and valve stem 200 contained inside the dust shield 10 are visible through dust shield 10, these portions are shown in FIG. 2 in solid rather than broken lines. The preferred dust shield 10 material is silicone because it is has these characteristics, and also is preferred because it has good temperature characteristics, a good compression set and ozone resistance. Where the dust shield 10 is formed of transparent material, the shield exposing end 24 may be closed and gauge indicator display window 126 is viewed through the dust shield 10. Still alternatively, the shield exposing end 24 is closed and a lateral viewing port (not shown) is provided in the shield tubular body 20 adjacent to and registering with the indicator display window 126.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A dust shield for fitting around and removably engaging an air pressure gauge apparatus fitted to a tire valve stem protruding from and in fluid communication with the interior of a tire, the pressure gauge apparatus including a tubular gauge housing substantially coaxial with the valve stem and having a gauge housing connected end secured to the valve stem and a gauge housing free end opposite the gauge housing connected end, the dust shield comprising:

a shield tubular body having an open longitudinal shield entry end which receives and passes the gauge housing as the dust shield is slid over the pressure gauge apparatus and sealingly abuts the tire valve stem and an open longitudinal shield exposing end through which the gauge housing free end slides out of the dust shield and is exposed for viewing and which sealingly abuts the gauge housing.

2. The dust shield of claim 1, wherein said air pressure gauge apparatus includes an outwardly protruding and circumferential gauge flange, the dust shield additionally comprising:

a circumferential internal shield channel sized and positioned to engagingly receive the gauge flange when the dust shield is fitted over the gauge housing to releasibly lock the dust shield onto the gauge housing.

3. The dust shield of claim 1, wherein said shield tubular body has a shield middle section which bows outwardly relative to the shield entry end to be spaced outwardly from the gauge housing.

4. The dust shield of claim 1, wherein the pressure gauge housing free end comprises a pressure indicator display window and a pressure indicator element visible through the indicator display window displaying tire pressure.

5. The dust shield of claim 1, wherein the dust shield comprises a material which is flexible and resilient to permit momentary deformation of the dust shield to permit the dust shield to fit over and engage the gauge housing.

6. The dust shield of claim 1, wherein the dust shield comprises a material which is transparent.

7. The dust shield of claim 1, wherein the dust shield comprises silicone.

8. An apparatus comprising:

a tire comprising a tire interior and a tire stem secured to said tire and in fluid communication with the tire interior;

an air pressure gauge apparatus fitted to said tire valve stem, said pressure gauge apparatus comprising a tubular gauge housing substantially coaxial with said valve stem and having a gauge housing connected end secured to said valve stem and a gauge housing free end opposite said gauge housing connected end;

and a dust shield comprising a shield tubular body having a longitudinal shield entry end and being fitted around said gauge housing, said shield entry end sealingly abutting said tire valve stem.

9. The dust shield of claim 1, wherein said dust shield comprises a longitudinal shield exposing end through which said housing free end slides out of the dust shield and is exposed for viewing and which sealingly engages the gauge housing.

10. The dust shield of claim 8, wherein said air pressure gauge apparatus includes an outwardly protruding and circumferential gauge flange, said dust shield additionally comprising:

a circumferential internal shield channel sized and positioned to engagingly receive the gauge flange to releasibly lock the dust shield onto the gauge housing.

11. The dust shield of claim 8, wherein said shield tubular body has a shield middle section which bows outwardly to be spaced outwardly from said gauge housing.

12. The dust shield of claim 8, wherein said pressure gauge housing free end comprises a pressure indicator display window and a pressure indicator element visible through said indicator display window displaying tire pressure.

13. The dust shield of claim 8, wherein said dust shield comprises a material which is flexible and resilient to permit momentary deformation of said dust shield to permit said dust shield to fit over and engage the gauge housing.

14. The dust shield of claim 8, wherein said dust shield comprises a material which is transparent.

15. The dust shield of claim 8, wherein said dust shield comprises silicone.

16. An apparatus comprising:

a tire comprising a tire interior and a tire stem secured to said tire and in fluid communication with the tire interior;

an air pressure gauge apparatus fitted to said tire valve stem, said pressure gauge apparatus comprising a tubular gauge housing substantially coaxial with said valve stem and having a gauge housing connected end secured to said valve stem and a gauge housing free end opposite said gauge housing connected end;

and a dust shield comprising a shield tubular body having a longitudinal shield entry end and being fitted around said gauge housing.

17. A dust shield for fitting around and removably engaging an air pressure gauge apparatus fitted to a tire valve stem protruding from and in fluid communication with the interior of a tire, the pressure gauge apparatus including a tubular gauge housing substantially coaxial with the valve stem and having a gauge housing connected end secured to the valve stem and a gauge housing free end opposite the gauge housing connected end, said dust shield comprising:

a shield tubular body having an open longitudinal shield entry end which receives and passes the gauge housing as the dust shield is slid over the pressure gauge apparatus and sealingly abuts the tire valve stem.

* * * * *